(12) United States Patent
Profendiner

(10) Patent No.: US 11,498,458 B2
(45) Date of Patent: Nov. 15, 2022

(54) METHOD FOR OPERATING A SAFETY SYSTEM FOR A SEAT SYSTEM OF A MOTOR VEHICLE, AND SAFETY SYSTEM FOR A SEAT SYSTEM OF A MOTOR VEHICLE

(71) Applicant: AUDI AG, Ingolstadt (DE)

(72) Inventor: Daniel Profendiner, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 420 days.

(21) Appl. No.: 16/756,381

(22) PCT Filed: Oct. 5, 2018

(86) PCT No.: PCT/EP2018/077127
§ 371 (c)(1),
(2) Date: Apr. 15, 2020

(87) PCT Pub. No.: WO2019/076648
PCT Pub. Date: Apr. 25, 2019

(65) Prior Publication Data
US 2020/0276917 A1    Sep. 3, 2020

(30) Foreign Application Priority Data

Oct. 16, 2017   (DE) .................. 10 2017 218 444.2

(51) Int. Cl.
*B60N 2/02*     (2006.01)
*B60N 2/00*     (2006.01)
(Continued)

(52) U.S. Cl.
CPC ............ *B60N 2/0244* (2013.01); *B60K 35/00* (2013.01); *B60N 2/002* (2013.01); *B60R 11/04* (2013.01);
(Continued)

(58) Field of Classification Search
CPC .................. B60N 2/0244; B60N 2/002; B60N 2002/0268; B60K 35/00; B60K 2370/182;
(Continued)

(56) References Cited

U.S. PATENT DOCUMENTS 6,099,030 A     8/2000  Kraft
2001/0013697 A1*  8/2001  Saito ................. B60R 21/01532
                                                 701/45
(Continued)

FOREIGN PATENT DOCUMENTS

CN     104105617 A     10/2014
CN     105799616 A      7/2016
(Continued)

OTHER PUBLICATIONS

International Search Report dated Jan. 18, 2019, from International Application No. PCT/EP2018/077127, 3 pages.
(Continued)

*Primary Examiner* — Peter D Nolan
*Assistant Examiner* — Demetra R Smith-Stewart
(74) *Attorney, Agent, or Firm* — Staas & Halsey, LLP

(57) ABSTRACT

A detection is made as to whether a vehicle occupant seated on a vehicle seat of a seating system of a motor vehicle has put on a pair of electronic data glasses. If the vehicle occupant has put on a pair of electronic data glasses, a check is performed to determine whether a predetermined minimum distance exists between the vehicle seat and an interior component of the motor vehicle. If the minimum distance exists, an adjustment range of the seating system is restricted in such a way that it is not possible to fall below the minimum distance. If the minimum distance does not exist, the minimum distance is established by automatically adjusting the seating system and/or outputting a message relating to the noncompliance with the minimum distance.

20 Claims, 1 Drawing Sheet

(51) Int. Cl.
*B60R 21/205* (2011.01)
*B60R 11/04* (2006.01)
*B60K 35/00* (2006.01)

(52) U.S. Cl.
CPC ...... *B60R 21/205* (2013.01); *B60K 2370/157* (2019.05); *B60K 2370/182* (2019.05); *B60K 2370/741* (2019.05); *B60N 2002/0268* (2013.01)

(58) Field of Classification Search
CPC ........ B60K 2370/741; B60K 2370/157; B60R 11/04; B60R 21/205
See application file for complete search history.

(56) References Cited

U.S. PATENT DOCUMENTS

| | | | |
|---|---|---|---|
| 2002/0158453 A1* | 10/2002 | Levine | B60N 2/42736 280/735 |
| 2006/0018518 A1 | 1/2006 | Fritzsche et al. | |
| 2015/0283902 A1* | 10/2015 | Tuukkanen | G06T 19/006 340/461 |
| 2017/0113702 A1 | 4/2017 | Thieberger-Navon et al. | |
| 2017/0123503 A1* | 5/2017 | Szczerba | B60K 37/06 |

FOREIGN PATENT DOCUMENTS

| | | |
|---|---|---|
| DE | 198 26 662 A1 | 12/1999 |
| DE | 100 29 613 A1 | 1/2001 |
| DE | 102 57 963 A1 | 7/2004 |
| DE | 10 2004 037 914 B4 | 8/2006 |
| DE | 10 2014 009 638 A1 | 12/2015 |
| DE | 10 2015 013 624 A1 | 4/2016 |
| DE | 10 2015 011 589 A1 | 3/2017 |
| DE | 10 2015 011 598 A1 | 3/2017 |
| DE | 10 2017 218 444.2 | 10/2017 |
| EP | 2 883 748 A1 | 6/2015 |
| GB | 2 410 593 A | 8/2005 |
| JP | 2007-168480 A | 7/2007 |
| WO | 03/013912 A1 | 2/2003 |
| WO | PCT/EP2018/077127 | 10/2018 |

OTHER PUBLICATIONS

German Office Action dated Mar. 1, 2018 from German Application No. 10 2017 218 444.2, 10 pages.

"In-Car use of VR HMDs by passengers," Multimodal Interaction Group HCI Research at the University of Glasgow, Glasgow Interactive Systems Group, available at http://mig.dcs.gla.ac.uk/in-car-use-of-vr-hmds-by-passengers/ (2017) 2 pages.

Hock et al., "CarVR: Enabling In-Car Virtual Reality Entertainment", available at https://www.uni-ulm.de/fileadmin/website_uni_ulm/iui.inst.100/institut/Papers/Prof_Rukzio/2017/paper2106.pdf (May 2017) 11 pages.

English translation of International Preliminary Report on Patentability dated Apr. 21, 2020, from International Patent Application No. PCT/EP2018/077127, 7 pages.

Chinese Office Action dated Oct. 11, 2021, in Chinese Application No. 201880067224.0 (10 pages).

* cited by examiner

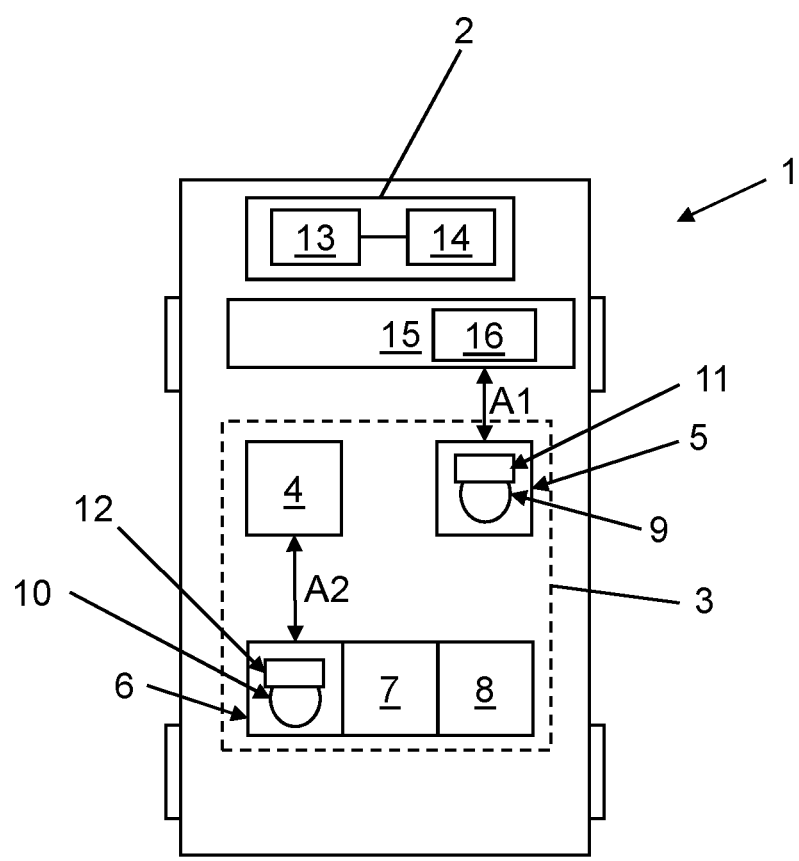

METHOD FOR OPERATING A SAFETY SYSTEM FOR A SEAT SYSTEM OF A MOTOR VEHICLE, AND SAFETY SYSTEM FOR A SEAT SYSTEM OF A MOTOR VEHICLE

CROSS REFERENCE TO RELATED APPLICATIONS

This application is a U.S. national stage of International Application No. PCT/EP2018/077127, filed on Oct. 5, 2018. The International Application claims the priority benefit of German Application No. 10 2017 218 444.2 filed on Oct. 16, 2017. Both International Application No. PCT/EP2018/077127 and German Application No. 10 2017 218 444.2 are incorporated by reference herein in their entirety.

BACKGROUND

Described herein is a method for operating a safety system for a seating system of a motor vehicle and a safety system for a seating system of a motor vehicle.

Electronic data glasses, for example, in the form of virtual-reality glasses or also in the form of augmented-reality glasses, will very probably be used in motor vehicles more and more frequently in the future. These may be used, for example, to assist a driver in the awareness of his driving task. Moreover, it is also possible by use of such electronic data glasses that, for example, passengers can be entertained during the travel with the motor vehicle.

German Patent Application No. 102 57 963 A1 describes a method and a device for determining the 3D position of passenger vehicle occupants. In this case, an electromagnetic tracking system records a head position and viewing direction of a user. Inter alia, an exact determination of a 3D head position is performed, wherein a head support is set for individual optimization of the occupant safety based thereon. Moreover, performing an individual setting of a vehicle seat in awareness of the eye position is provided.

German Patent Application No. 10 2014 009 638 A1 describes a method for detecting a viewing direction of a driver in a motor vehicle.

German Patent Application No. 10 2015 011 598 A1 describes a method for operating a pair of virtual-reality glasses.

Moreover, European Patent Application No. 2 883 748 A1 describes a method for displaying items of optical information in vehicles. In this context, it is provided that the eye position of a driver is determined. Furthermore, it is also provided in this context that the seat position of the driver is retrieved.

SUMMARY

Described herein is an option by use of which a particularly reliable operation of electronic data glasses in motor vehicles can be enabled.

This may be achieved by a method for operating a safety system for a seating system of a motor vehicle and by a safety system for a seating system of a motor vehicle having the features described herein. Advantageous designs having expedient and nontrivial refinements are further described herein.

In the method described herein for operating a safety system for a seating system of a motor vehicle, it is detected whether a vehicle occupant seated on a vehicle seat of the seating system has put on a pair of electronic data glasses. Depending on the design and/or configuration of the motor vehicle, the seating system can include a plurality of vehicle seats or in the extreme case can also include only one single vehicle seat. If the vehicle occupant has put on a pair of electronic data glasses, it is checked whether a predetermined minimum distance exists between the vehicle seat and an interior component. The electronic data glasses can be any arbitrary electronic data glasses, wherein the electronic data glasses are for example a pair of virtual-reality glasses or also augmented-reality glasses.

If it should be detected that the minimum distance exists, an adjustment range of the seating system is restricted in such a way that it is not possible to fall below the minimum distance. The restriction of the adjustment range of the seating system can be understood as a restriction of the adjustment range of the vehicle seat on which the vehicle occupant sits with the electronic data glasses put on, and/or the restriction of an adjustment range of another vehicle seat, on which the relevant vehicle occupant is presently not seated with the electronic data glasses put on. In contrast, if it is detected that the minimum distance does not exist, the minimum distance is established by automatically adjusting the seating system and/or a message relating to the noncompliance with the minimum distance is output.

The basic concept of the method described herein is that it can be necessary with regard to a high level of crash safety to take measures during the use of such electronic data glasses. As soon it is detected and/or determined that a vehicle occupant of the motor vehicle has put on a pair of electronic data glasses, it is determined and checked whether a predetermined minimum distance exists between the vehicle seat, on which the vehicle occupant having the electronic data glasses put on is seated, and a further interior component. The minimum distance is, for example, specified with respect to the vehicle longitudinal direction. The interior component can be arbitrary components in the vehicle interior, which are arranged in front of the relevant vehicle seat, on which the vehicle occupant having the electronic data glasses put on is seated.

It is ensured by the method described herein that the minimum distance between the vehicle seat of the seating system on which the vehicle occupant having the electronic data glasses is seated and the interior component is maintained. If the minimum distance exists between the vehicle seat on which the vehicle occupant having the electronic data glasses is seated and the interior component, the adjustment range of the seating system is thus restricted in such a way that it is also not possible to fall below the minimum distance. In contrast, if it should be established that the minimum distance does not exist, i.e., the distance between the vehicle seat on which the vehicle occupant having the electronic data glasses is seated and the interior component is less than the minimum distance, an automatic adjustment of the seating system is thus performed to establish the minimum distance and/or the output of a message relating to the noncompliance with the minimum distance.

The minimum distance can be specified, for example, in relation to a back rest of the vehicle seat and the relevant interior component. Alternatively or additionally, it is also possible, for example, that a front edge of a seat surface of the vehicle seat is selected as a reference point, for example, at which the minimum distance is established between the interior component and the vehicle seat.

By use of the method described herein, it can be ensured that a wearer of a pair of electronic data glasses is not injured because of the put-on electronic data glasses, in particular in case of crash or even in the event of a strong braking procedure. This is ensured in that the minimum distance between the vehicle seat and the interior component is ensured, which also has an effect on the distance between the electronic data glasses and the interior component. It is thus possible to prevent, for example, the wearer of the electronic data glasses from being affected upon triggering of an airbag and because of the put-on electronic data glasses. It is also possible, for example, that the vehicle occupant who has put on the electronic data glasses is prevented from striking on an interior component, for example, a back rest of a front seat, with the electronic data glasses in the event of a strong braking procedure or in case of crash, if the wearer of the electronic data glasses should presently be seated in the rear compartment.

One advantageous embodiment described herein provides that if the vehicle seat is a front seat, the minimum distance relates to a distance between the front seat and a dashboard having an airbag integrated therein. In this advantageous embodiment, the method is based on the finding that electronic data glasses typically extend the head of the wearer of such a pair of electronic data glasses forward in the vehicle longitudinal direction. A type of defined opening level of an airbag can thus be ensured, for example, i.e., in other words an opening range of the relevant airbag cannot be negatively affected by the put-on electronic data glasses. In the case of a front seat, it is thus ensured that the wearer of the electronic data glasses is not seated so close to the dashboard having the airbag integrated therein. A particularly reliable functionality of the airbag can thus be ensured, without the wearer of the electronic data glasses being affected upon triggering of the airbag.

A further advantageous embodiment described herein provides that if the minimum distance exists, an adjustment range of the front seat is restricted in such a way that it is not possible to fall below the minimum distance between the front seat and the dashboard. If the front seat is, for example, an electrically adjustable seat, the adjustment range of the front seat with respect to the adjustability in the vehicle longitudinal direction and/or a back rest inclination of the front seat can simply be electronically restricted in such a way that it is not possible to fall below the minimum distance between the front seat and the dashboard. In contrast, if it is a vehicle seat which can only be manually adjusted, electronically and/or electrically adjustable blocking elements can thus be provided, for example, which restrict a displacement of the front seat in the vehicle longitudinal direction and/or an adjustment of a back rest inclination of the front seat in such a way that it is also not possible to fall below the minimum distance between the front seat and the dashboard.

According to a further advantageous embodiment described herein, it is provided that if the distance has fallen below the minimum distance, the front seat is automatically adjusted in such a way that the minimum distance is established between the front seat and the dashboard and/or a message relating to the noncompliance with the minimum distance is output. If the front seat should be electrically adjustable, it can thus be automatically adjusted particularly easily, for example, by the front seat being pushed back accordingly in the vehicle longitudinal direction and/or a back rest inclination of the front seat being set in such a way that at least the minimum distance is established between the front seat and the dashboard. Alternatively or additionally, a message relating to the noncompliance with the minimum distance between the front seat and the dashboard can also be output. For example, the message can be output by use of the electronic data glasses themselves, so that the wearer of the electronic data glasses is informed directly about the circumstance that the recommended minimum distance presently does not exist between the front seat and the dashboard. Of course, a corresponding acoustic message can alternatively or additionally also be output.

In a further advantageous design described herein, it is provided that if the vehicle seat is a rear seat, the minimum distance relates to a distance between the rear seat and a back rest of a front seat arranged in front of it. In this case, it is not important at all to not negatively influence an opening range of an airbag due to the put-on electronic data glasses. Instead, it is important here that the wearer of the electronic data glasses who is seated on the rear seat does not strike against the back rest of the front seat located in front of him with the put-on electronic data glasses in the event of a strong braking procedure or also in case of a crash. In the cases in which the vehicle occupant who has put on the electronic data glasses has thus taken a seat on the rear seat, it can thus also be ensured that the minimum distance between the relevant rear seat and a back rest located in front of it can be ensured.

In a further advantageous design described herein, it is provided that if the minimum distance exists, an adjustment range of the front seat is restricted in such a way that it is not possible to fall below the minimum distance between the back rest of the front seat and the rear seat. In this case, the seat on which the wearer of the electronic data glasses is seated is not adjusted at all. Instead, the front seat is restricted with regard to its adjustment range in such a way that it is not possible to fall below the minimum distance between the back rest of the front seat and the rear seat on which the wearer of the electronic data glasses is seated. The adjustment range can again be related to the adjustment range in the vehicle longitudinal direction and/or also to the adjustment range with regard to an inclination of the back rest of the front seat.

A further advantageous embodiment described herein provides that if the distance has fallen below the minimum distance, the front seat is automatically adjusted in such a way that the minimum distance is established between the back rest of the front seat and the rear seat and/or a message relating to the noncompliance with the minimum distance is output. For the case in which the wearer of the electronic data glasses has thus taken a seat on the rear seat, it is provided that the rear seat as such is not adjusted if the distance falls below the minimum distance. Instead, the front seat located in front of the rear seat on which the wearer of the electronic data glasses has taken a seat is simply automatically adjusted in such a way that the minimum distance is established between the back rest of the front seat and the rear seat. Alternatively or additionally, it is again also possible that a message relating to the noncompliance with the minimum distance is output. In the cases in which the adjustment range of the front seat, on which the wearer of the electronic data glasses is not presently seated, is restricted or automatically adjusted, it is provided that a corresponding notification about this may also be output in the front region of the motor vehicle via a suitable output device in the motor vehicle. If the front seat is a passenger seat, for example, a passenger can thus be informed in a simple manner that the adjustment range of his seat has presently been restricted or that his seat is about to be automatically adjusted, for example, to establish the minimum distance between the back rest of the front seat and the rear seat.

According to a further advantageous embodiment described herein, it is provided that as long as the minimum distance does not exist, the electronic data glasses are deactivated except for an option of outputting the message relating to the noncompliance with the minimum distance. The wearer of the electronic data glasses thus cannot use them at all, since they cannot be operated at all as long as the minimum distance does not exist. If the minimum distance should thus not be able to be set or if the vehicle occupants, for whatever reason, presently do not wish the seating system to be adjusted accordingly, the wearer of the electronic data glasses thus also cannot use them and will very probably also take them off. The crash safety when electronic data glasses are put on can thus also be increased, because the electronic data glasses very probably only remain put on if the minimum distance also exists.

A further advantageous embodiment described herein provides that after the vehicle occupant has put on the electronic data glasses in the motor vehicle, it is queried by use of the electronic data glasses where the vehicle occupant sits. The vehicle occupant can then indicate, for example, in a speech-based manner or in any arbitrary other manner on which vehicle seat of the seating system he has presently taken a seat. In this case, it does not even have to be complexly determined first where the wearer of the electronic data glasses is seated, since this will be communicated by the wearer of the electronic data glasses himself because of the automatic query.

In a further advantageous design described herein, it is provided that it is detected by use of a camera system whether the vehicle occupant has put on a pair of electronic data glasses. It can thus be determined in a simple and reliable manner whether the vehicle occupant also actually presently wears a pair of electronic data glasses.

In a further advantageous design described herein, it is provided that the minimum distance is individually specified in dependence on a size of the vehicle occupant, in particular in dependence on a length of an upper body of the vehicle occupant. If, for example, the vehicle occupant should have relatively short legs with a relatively long upper body, he will thus under certain circumstances displace his vehicle seat relatively far forward. This is because he will not require very much leg free space. However, the seat positioning with relatively long upper body can under certain circumstances be unfavorable with regard to the crash safety with electronic data glasses put on. If the minimum distance is individually specified in dependence on the size of the vehicle occupant, in particular in dependence on the length of his upper body, it can be ensured in a particularly reliable manner that the relevant vehicle occupant who has put on the electronic data glasses maintains the minimum distance required for him from the interior components located in front of him with electronic data glasses put on.

In a further advantageous design described herein, it is provided that the automatic adjustment of the seating system only takes place after it has been manually confirmed. For example, if the adjustment of the vehicle seat on which the wearer of the electronic data glasses himself is seated takes place, it can thus be necessary for the wearer of the electronic data glasses to have to confirm the automatic adjustment of his vehicle seat to establish the minimum distance beforehand. The confirmation can be performed, for example, by a speech command, by actuating buttons, by executing a gesture, or the like. In contrast, if it is provided that, for example, the front seat is adjusted, while the wearer of the electronic data glasses is seated on the rear seat, it can thus be provided that the person seated on the front seat first has to confirm the automatic adjustment of their seat. For example, it can be provided that a button reachable well from the front seat has to be actuated. Alternatively or additionally, for example, it can also be provided that a speech command has to be spoken by the person seated on the front seat, wherein it can be checked by use of a camera system, for example, whether the person seated on the front seat has also actually expressed the speech command. Because the automatic adjustment of the seating system may only take place after it has been manually confirmed, for example, it can thus be ensured that the respective vehicle occupants who are seated on the relevant vehicle seat of the seating system which is supposed to be adjusted are not surprised or in the worst case even injured by the automatic adjustment of the seating system.

The safety system described herein for a seating system of a motor vehicle includes a detection unit, which is designed to detect whether a vehicle occupant seated on a vehicle seat of the seating system has put on a pair of electronic data glasses. Furthermore, the safety system includes a control unit, which is designed to check whether a predetermined minimum distance exists between the vehicle seat and an interior component if the vehicle occupant has put on a pair of electronic data glasses. Furthermore, the control unit is designed to restrict an adjustment range of the seating system in such a way that it is not possible to fall below the minimum distance, if the minimum distance exists. Moreover, the control unit is designed to establish the minimum distance by automatic adjustment of the seating system and/or to output a message relating to the noncompliance with the minimum distance if the minimum distance does not exist. Advantageous designs of the method described herein are to be considered to be advantageous designs of the safety system described herein and vice versa, wherein the safety system carriers out operations of the method.

The motor vehicle described herein includes the safety system described herein and/or an advantageous embodiment of the safety system described herein.

Further advantages, features, and details result from the following description of example embodiments and on the basis of the single drawing. The features and feature combinations mentioned above in the description and the features and feature combinations shown mentioned hereafter in the description of the drawing and/or shown solely in the single drawing are usable not only in the particular specified combination, but rather also in other combinations or alone, without leaving the scope of the disclosure.

BRIEF DESCRIPTION OF THE DRAWING

These and other aspects and advantages will become more apparent and more readily appreciated from the following description of the example embodiments, taken in conjunction with the accompanying single drawing which illustrates a motor vehicle having a safety system for a seating system of a motor vehicle according to the disclosure.

DETAILED DESCRIPTION

The drawing shows, in the single FIG, a motor vehicle having a safety system for a seating system of a motor vehicle, which is designed to ensure particularly safe operation of electronic data glasses in the vehicle interior.

A motor vehicle 1 is shown in a very schematic illustration in the single FIG. The motor vehicle 1 includes a safety system 2 for a seating system 3 of the motor vehicle 1. In the exemplary embodiment presently shown, the seating system 3 includes a vehicle seat 4, a front passenger seat 5, and also three rear seats 6, 7, 8. A front passenger 9 and a further rear passenger 10 have each put on a pair of electronic data glasses 11, 12. The safety system 1 is used to enable particularly safe usage of the electronic data glasses 11, 12 in the motor vehicle 1.

To ensure this, the safety system 2 includes a detection unit (detector) 13, which is designed to detect whether the respective vehicle occupants 9, 10 have put on the electronic data glasses 11, 12. Moreover, the safety system 2 includes a control unit (controller) 14, which is designed to check whether a respective predetermined minimum distance A1 or A2, respectively, exists between the respective vehicle seat 5 or 6 and a respective interior component, if the respective vehicle occupants 9, 10 have put on the electronic data glasses 11, 12. The control unit 14 can restrict an adjustment range of the seating system 3 in such a way that it is not possible to fall below respective minimum distances A1, A2, if it is established that the respective minimum distances A1 or A2, respectively, presently exist. Moreover, the control unit 14 can establish the respective minimum distances A1, A2 by automatically adjusting the seating system 3 and/or outputting at least one message relating to the noncompliance with the respective minimum distances A1, A2 if the minimum distances A1 and/or A2 should not exist.

For the front passenger 9, this means for example that the minimum distance A1 relates to a distance between the front passenger seat 5 and a dashboard 15, in which an airbag 16 is integrated. With electronic data glasses 11 put on, it is thus monitored whether the front passenger seat 5 is set so that the minimum distance A1 to the dashboard 15 is maintained. If it should be established that this minimum distance A1 exists, an adjustment range of the front passenger seat 5 is restricted in such a way that it is not possible to fall below the minimum distance A1 between the passenger seat 5 and the dashboard 15. If the front passenger seat 5 can be adjusted fully electrically, for example, it can thus be provided that the front passenger seat 5 can no longer be displaced all the way forward in the vehicle longitudinal direction and/or a back rest (not identified in greater detail here) of the front passenger seat 5 cannot be pivoted forward arbitrarily.

In contrast, if it should be established by use of the detection unit 13 that the distance has fallen below the minimum distance A1, i.e., the minimum distance does not exist, the front passenger seat 5 is, for example, automatically adjusted by corresponding activation by use of the control unit 14 to establish the minimum distance A1 between the front passenger seat 5 and the dashboard 15. Alternatively or additionally, it is also possible that if the minimum distance A1 should not exist, a message relating to the noncompliance with this minimum distance A1 is output. The message can be output, for example, via the electronic data glasses 5, so that the front passenger 9 can recognize this directly. This can have a solely informational character, for example. However, it can also be equally possible that the front passenger seat 5 is not electrically adjustable at all and is therefore also not automatically adjustable. In this case, such an output of the message is used to encourage the front passenger 5 to adjust the front passenger seat 9 in such a way that the minimum distance A1 is at least preserved.

In the case of the rear passenger 10 seated on the rear seat 6, it is not important that an airbag can unfold particularly well and uncritically with the electronic data glasses 12 put on. Rather, here it is important that the vehicle occupant 10 does not collide with the put-on electronic data glasses 12 with a back rest (not identified in greater detail) of the driver seat 4 when electronic data glasses 12 are put on and there is a strong braking procedure or in the event of a crash. If it is established that the minimum distance A2 between the rear seat 6 and a back rest (not identified in greater detail) of the front seat 4 arranged in front does not exist, the driver seat 4 is, for example, automatically adjusted to establish (provide) the minimum distance A2. This can be performed, for example, solely by shifting the front seat 4 forward and/or also by a corresponding adaptation of the back rest inclination of the vehicle seat 4. In contrast, if it should be established that the minimum distance A2 is provided between the rear seat 6 and the back rest of the driver seat 4, the adjustment range of the driver seat 4 is thus restricted in such a way that it is also not possible to fall below the minimum distance A2 between the back rest of the driver seat 4 and the back seat 6.

As long as the minimum distances A1, A2 do not exist, the electronic data glasses 11, 12 are deactivated except for an option of indicating the noncompliance with the respective minimum distances A1, A2. The vehicle occupants 9, 10 thus cannot use the put-on electronic data glasses 11, 12 at all, for example, to have films displayed, to enjoy other media content, or the like, as long as it is not ensured that respective minimum distances A1, A2 are maintained.

To be able to recognize in a particularly simple manner whether the vehicle occupants 9, 10 have put on the electronic data glasses 11, 12, it can be provided that the electronic data glasses 11, 12 automatically query where the respective vehicle occupant 9, 10 is seated as soon he has put on the relevant electronic data glasses 11 or 12, respectively. Alternatively or additionally, it is also possible that a camera system is used to detect whether the vehicle occupants 9, 10 have put on the electronic data glasses 11 or 12, respectively.

The minimum distances A1, A2 can moreover be individually predetermined in dependence on a respective size of the vehicle occupants 9, 10, in particular in dependence on the length of their upper bodies. In the case of a person 9 seated on the front passenger seat 5, it can thus be ensured that the airbag 16 can unfold uncritically in spite of put-on electronic data glasses 11 and can thus ensure the optimum protection for the front passenger 9. In the case of the vehicle occupant 10 seated on the rear seat 6, it can be ensured in a manner adapted to his size, in particular adapted to the length of his upper body, that if the minimum distance A2 is maintained, he definitively will not collide with the electronic data glasses 12 on the rear side of the vehicle seat 4 even in the event of a strong braking maneuver or in case of crash.

The automatic adjustment of the seating system 5 is, for example, always performed only after it has been manually confirmed. In the case of the front passenger seat 5, for example, this can mean that the person 9 first has to manually confirm that the front passenger seat 5 can also be adjusted in such a way that the minimum distance A1 is also established—if it is presently not maintained. In the case of the person seated on the rear seat 6, this can in turn mean with the confirmation that a driver (not shown here) is firstly made aware that the driver seat 4 is supposed to be adjusted, wherein in this case the driver first has to confirm that the driver seat 4 can also actually be automatically adjusted so that the minimum distance A2 is established. In particular in the last case, this can be safety critical, of course, because the driver seat 4 should ideally only be adjusted if the driver first knows this and second also presently wishes to permit this. In either way, it can thus be ensured by the confirmation requirement before adjustment of the seating system 5 that the affected persons who are seated on the seats 5 or 4, respectively, to be adjusted are made aware of this, have to confirm it, and accordingly are also not surprised or in the extreme case even injured.

By use of the explained safety system 2 and the explained procedure during the operation of the safety system 2, a particularly safe operation and/or a particularly safe use of electronic data glasses 11, 12 in the vehicle interior of a motor vehicle 1 can be ensured in a simple and reliable manner.

A description has been provided with reference to example embodiments, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV*, 358 F3d 870, 69 USPQ2d 1865 (Fed. Cir. 2004).

The invention claimed is:

1. A method for operating a safety system for a seating system of a motor vehicle, the method comprising:
    detecting whether a vehicle occupant seated on a vehicle seat of the seating system has put on a pair of electronic data glasses;
    when the detecting detects the vehicle occupant has put on the pair of electronic data glasses:
        determining whether a distance between the vehicle seat and an interior component of the motor vehicle is greater than a predetermined minimum distance,
        when determining the distance between the vehicle seat and the interior component is greater than the predetermined minimum distance, restricting an adjustment range of the seating system to prevent the distance between the vehicle seat and the interior component from becoming less than the predetermined minimum distance, and
        when determining the distance between the vehicle seat and the interior component is less than the predetermined minimum distance, establishing the predetermined minimum distance includes automatically adjusting at least a portion of the seating system so that the distance between the vehicle seat and the interior component is greater than the predetermined minimum distance and/or outputting a message relating to the distance between the vehicle seat and the interior component being less than the predetermined minimum distance.

2. The method according to claim 1, wherein
    the vehicle seat is a front seat and the interior component is a dashboard of the motor vehicle having an airbag integrated therein, and
    the predetermined minimum distance corresponds to a distance between the front seat and the dashboard.

3. The method according to claim 2, wherein when the distance between the front seat and the dashboard is greater than the predetermined minimum distance, restricting the adjustment range of the seating system includes restricting an adjustment range of the front seat to prevent the distance between the front seat and the dashboard from becoming less than the predetermined minimum distance.

4. The method according to claim 2, wherein when the distance between the front seat and the dashboard is less than the predetermined minimum distance, establishing the predetermined minimum distance by automatically adjusting the front seat so that the distance between the front seat and the dashboard is greater than the predetermined minimum distance and/or by outputting a message relating to the distance between the front seat and the dashboard being less than the predetermined minimum distance.

5. The method according to claim 1, wherein
    the vehicle seat is a rear seat and the interior component is a back rest of a front seat of the motor vehicle arranged in front of the rear seat, and
    the predetermined minimum distance corresponds to a distance between the rear seat and the back rest of the front seat.

6. The method according to claim 5, wherein when the distance between the rear seat and the back rest of the front seat is greater than the predetermined minimum distance, restricting the adjustment range of the seating system includes restricting an adjustment range of the front seat to prevent the distance between the rear seat and the back rest of the front seat from becoming less than the predetermined minimum distance.

7. The method according to claim 5, wherein when the distance between the rear seat and the back rest of the front seat is less than the predetermined minimum distance, establishing the predetermined minimum distance by automatically adjusting the front seat so that the distance between the rear seat and the back rest of the front seat is greater than the predetermined minimum distance and/or by outputting a message relating to the distance between the rear seat and the back rest of the front seat being less than the predetermined minimum distance.

8. The method according to claim 1, further comprising deactivating the electronic data glasses except for a capability of outputting the message, when the distance between the vehicle seat and the interior component is less than the predetermined minimum distance.

9. The method according to claim 1, further comprising:
    when the vehicle occupant has put on the electronic data glasses while in the motor vehicle, querying, by the electronic data glasses, where the vehicle occupant is seated within the motor vehicle.

10. The method according to claim 1, wherein detecting whether the vehicle occupant seated on the vehicle seat has put on the pair of electronic data glasses is performed using a camera.

11. The method according to claim 1, wherein the predetermined minimum distance is individually specified based on a size of the vehicle occupant.

12. The method according to claim 1, wherein the predetermined minimum distance is individually specified based on a length of an upper body of the vehicle occupant.

13. The method according to claim 1, wherein when the distance between the vehicle seat and the interior component is less than the predetermined minimum distance, establishing the predetermined minimum distance includes automatically adjusting the at least the portion of the seating system after a manual confirmation by the vehicle occupant or by another occupant of the motor vehicle.

14. A safety system for a seating system of a motor vehicle, the safety system comprising:
    a detector configured to detect whether a vehicle occupant seated on a vehicle seat of the seating system has put on a pair of electronic data glasses; and
    a controller, when the detector detects the vehicle occupant has put on the pair of electronic data glasses, configured:
        to determine whether a distance between the vehicle seat and an interior component of the motor vehicle is greater than a predetermined minimum distance,
        to restrict an adjustment range of the seating system to prevent the distance between the vehicle seat and the interior component from becoming less than the predetermined minimum distance, when the controller determines the distance between the vehicle seat and the interior component is greater than the predetermined minimum distance, and to establish the predetermined minimum distance by automatically adjusting at least a portion of the seating system so that the distance between the vehicle seat and the interior component is greater than the predetermined minimum distance and/or by outputting a message relating to the distance between the vehicle seat and the interior component being less than the predetermined minimum distance, when the controller determines the distance between the vehicle seat and the interior component is less than the predetermined minimum distance.

15. A motor vehicle, comprising:
an interior component;
a seating system including a vehicle seat; and
a safety system, including:
  a detector configured to detect whether a vehicle occupant seated on the vehicle seat has put on a pair of electronic data glasses, and
  a controller, when the detector detects the vehicle occupant has put on the pair of electronic data glasses, configured:
    to determine whether a distance between the vehicle seat and the interior component is greater than a predetermined minimum distance,
    to restrict an adjustment range of the seating system to prevent the distance between the vehicle seat and the interior component from becoming less than the predetermined minimum distance, when the controller determines the distance between the vehicle seat and the interior component is greater than the predetermined minimum distance, and
    to establish the predetermined minimum distance by automatically adjusting at least a portion of the seating system so that the distance between the vehicle seat and the interior component is greater than the predetermined minimum distance and/or by outputting a message relating to the distance between the vehicle seat and the interior component being less than the predetermined minimum distance, when the controller determines the distance between the vehicle seat and the interior component is less than the predetermined minimum distance.

16. The motor vehicle according to claim 15, wherein
the vehicle seat is a front seat, and the interior component is a dashboard of the motor vehicle having an airbag integrated therein,
the predetermined minimum distance corresponds to a distance between the front seat and the dashboard,
when the distance between the front seat and the dashboard is greater than the predetermined minimum distance, the controller is configured to restrict the adjustment range of the seating system by restricting an adjustment range of the front seat to prevent the distance between the front seat and the dashboard from becoming less than the predetermined minimum distance, and
when the distance between the front seat and the dashboard is less than the predetermined minimum distance, the controller is configured to establish the predetermined minimum distance by automatically adjusting the front seat so that the distance between the front seat and the dashboard is greater than the predetermined minimum distance and/or by outputting a message relating to the distance between the front seat and the dashboard being less than the predetermined minimum distance.

17. The motor vehicle according to claim 16, wherein the controller is configured to restrict the adjustment range of the front seat by at least one of preventing an electronic movement of the front seat, electronically providing blocking elements to prevent movement of a manually adjustable front seat, or restricting adjustment of a back rest inclination of a back rest of the front seat.

18. The motor vehicle according to claim 15, wherein
the vehicle seat is a rear seat, and the interior component is a back rest of a front seat of the motor vehicle arranged in front of the rear seat,
the predetermined minimum distance corresponds to a distance between the rear seat and the back rest of the front seat,
when the distance between the rear seat and the back rest of the front seat is greater than the predetermined minimum distance, the controller is configured to restrict the adjustment range of the seating system by restricting an adjustment range of the front seat to prevent the distance between the rear seat and the back rest of the front seat from becoming less than the predetermined minimum distance, and
when the distance between the rear seat and the back rest of the front seat is less than the predetermined minimum distance, the controller is configured to establish the predetermined minimum distance by automatically adjusting the front seat so that the distance between the rear seat and the back rest of the front seat is greater than the predetermined minimum distance and/or by outputting a message relating to the distance between the rear seat and the back rest of the front seat being less than the predetermined minimum distance.

19. The motor vehicle according to claim 18, wherein the controller is configured to restrict the adjustment range of the front seat by at least one of preventing an electronic movement of the front seat, electronically providing blocking elements to prevent movement of a manually adjustable front seat, or restricting adjustment of a back rest inclination of the back rest of the front seat.

20. The motor vehicle according to claim 15, wherein the controller is configured to output the message relating to the distance between the vehicle seat and the interior component being less than the predetermined minimum distance by at least one of outputting the message to the electronic data glasses, outputting the message to a region adjacent to the interior component, or outputting an acoustic message.

* * * * *